United States Patent [19]

Isozumi

[11] Patent Number: 4,945,777

[45] Date of Patent: Aug. 7, 1990

[54] COAXIAL ENGINE STARTER

[75] Inventor: Shuzoo Isozumi, Himeji, Japan

[73] Assignee: Mitsubishi Denki Kabushiki Kaisha, Tokyo, Japan

[21] Appl. No.: 399,145

[22] Filed: Aug. 28, 1989

[30] Foreign Application Priority Data

Aug. 29, 1988 [JP] Japan ................................ 63-214330

[51] Int. Cl.[5] .......................... F02N 15/06; F16H 1/28

[52] U.S. Cl. .......................................... 74/7 E; 74/7 A; 74/411; 464/30; 475/331

[58] Field of Search ................ 74/7 R, 7 A, 7 C, 7 E, 74/801, 411; 464/30; 290/38 C, 48; 475/331

[56] References Cited

U.S. PATENT DOCUMENTS

| | | | |
|---|---|---|---|
| 4,494,414 | 1/1985 | Hamano | 74/7 E |
| 4,528,470 | 7/1985 | Young et al. | 74/7 E X |
| 4,613,761 | 9/1986 | Yahunaka | 290/38 R X |
| 4,635,489 | 1/1987 | Imamura et al. | 74/7 E |
| 4,760,274 | 7/1988 | Isozumi | 74/7 A X |
| 4,852,417 | 8/1989 | Tanaka | 74/7 A X |

FOREIGN PATENT DOCUMENTS 1311876 11/1962 France .

*Primary Examiner*—Allan D. Herrmann
*Attorney, Agent, or Firm*—Sughrue, Mion, Zinn, Macpeak and Seas

[57] ABSTRACT

A coaxial engine starter comprising an electric motor having a hollow armature rotary shaft, an axially slidable output rotary shaft rotatably supported in a housing and having at its front end a pinion engageable with an engine ring gear, a solenoid switch disposed behind the electric motor for supplying current to the electric motor and causing sliding movement of the output rotary shaft, a planetary speed reduction gear, disposed in front of the electric motor and having a planetary bracket, for speed reducing the rotation of the armature rotary shaft, an over-running clutch, disposed in front of the planetary speed reduction gear and having a clutch outer member and a clutch inner member, for transmitting the speed-reduced rotation of the planetary speed reduction gear to the output rotary shaft. The planetary bracket of the planetary speed reduction gear is fitted against the clutch outer member of the over-running clutch in such a manner that they slip relative to each other when a predetermined rotational torque is exerted therebetween. The starter also comprises a first bearing disposed between the planetary bracket and the armature rotary shaft for limiting the rearward movement of the planetary bracket, and a second bearing disposed between the housing and the clutch inner member of the over-running clutch for limiting the forward movement of the clutch outer member of the over-running clutch.

1 Claim, 3 Drawing Sheets

FIG. I

COAXIAL ENGINE STARTER

BACKGROUND OF THE INVENTION

This invention relates to a coaxial engine starter in which an armature rotary shaft of an electric starter motor, an output rotary shaft having a pinion on it for rotation therewith and an operating axle of a solenoid switch are coaxially arranged.

FIG. 1 is a sectional view showing a coaxial engine starter to which the present invention can be applied. In FIG. 1, a coaxial engine starter 100 comprises a d.c. motor 5 having a magnetic yoke 1, permanent magnets 2 mounted to the inner surface of the magnetic yoke 1 at intervals, an armature 3 rotatably supported within the magnetic yoke 1, and a commutator 4 disposed at one end of the armature 3.

The armature 3 of the d.c. motor 5 comprises a hollow armature rotary shaft 6 and an armature core 7 mounted to the outer circumference of the armature rotary shaft 6. On the front end (the right-hand end in FIG. 1) of the d.c. motor 5, an output rotary shaft 8 is disposed so that the rotation is transmitted thereto through a drive force transmitting mechanism 9. The drive force transmitting mechanism 9 comprises a planetary speed reduction gear 10, an over-running clutch 11 having a clutch inner member **11*a* and a clutch outer member 11*b*, and a helical spline 8*a* formed on the output rotary shaft 8 for engaging with the clutch inner 11*a*. The output rotary shaft 8 is disposed in alignment with the axis of the armature rotary shaft 6 of the d.c. motor 5, and its one end is inserted into the inner passage 6*a* of the armature rotary shaft 6 and axially slidably supported therein by a sleeve metal inserted therebetween. In order to prevent a thrust from the output rotary shaft 8 from being transmitted into the armature rotary shaft 6, a gap A is provided between the armature rotary shaft 6 and an enlarged-diameter portion 8*b* of the output rotary shaft 8**.

The transmission of the rotational force of the armature rotary shaft 6 is achieved through the planetary speed reduction gear 10 and the over-running clutch 11. The planetary speed reduction gear 10 comprises a sun gear **10*a* integrally formed on the front end of the armature rotary shaft 6, an inner teeth ring gear 10*b* disposed around the sun gear 10*a* and a plurality of planetary gears 10*d* rotatably supported by support pins 10*c* mounted to the clutch outer member 11*b* of the over-running clutch 11 and in engagement with the sun gear 10*a* and the inner teeth ring gear 10*b*. Also, the clutch inner member 11*a* of the over-running clutch 11 is in mesh with the helical spline 8*a* formed in the outer circumference of the enlarged diameter portion 8*b* of the output rotary shaft 8. Therefore, when output rotary shaft 8 is rotated by the clutch inner member 11*a*, it axially slides at the same time. Then, due to the sliding movement of the output rotary shaft 8, the pinion 15 mounted on the front end of the output rotary shaft 8 projects from the outer front bracket 13 to engage with the engine ring gear (not shown) to rotate it. A plurality of rollers 11*c* are disposed between the clutch inner member 11*a* and the clutch outer member 11*b***.

An inner teeth gear member **10*e* which also serves as an inner front bracket is fastened to the magnetic yoke 1 by bolts 34. The inner teeth gear member 10*e* has formed an inner teeth gear 10*b* in the inner circumferential surface at its rear end and a stepped portion 10*f* at its front end. The stepped portion 10*f* has fitted therein an outer race 12*a* of a ball bearing 12 with its rear end in an abutting relationship. The rear end of an inner race 12*b* of the bearing 12 is fitted onto a stepped portion 11*d* formed at the front end of the into a stepped portion 11*d* formed at the front end of the clutch inner member 11*a*. An outer front bracket 13 which may be replaced according to the type of the engine is fitted over the inner teeth gear member 10*e* which also is an inner bracket and fastened by bolts 14. The outer front bracket 13 also has an inner wall end portion 13*a* extending in front of the front end of the outer race 12*a* of the ball bearing 12 for bearing the forward thrust of the outer race 12*a*. A pinion engageable with an engine ring gear (not shown) which is mounted on the output rotary shaft 8 has a rear end face 15*a* in abutment with the inner race 12*b* of the ball bearing 12, so that its thrust force is supported by the inner race 12*b* of the ball bearing 12. In order to maintain the pinion 15 which is in a spline engagement with splines 8*c* formed on the output rotary shaft 8 at a predetermined axial position on the output rotary shaft 8, a stopper 16 is mounted on the output rotary shaft 8** by a stop ring.

A rear bracket 17 which is fitted over the rear end of the d.c. motor 5 has disposed in the rear portion thereof a solenoid switch 18 for shifting the output rotary shaft 8 and for allowing an electric power from a battery (not shown) to be supplied to the d.c. motor 5. The solenoid switch 18 comprises an excitation coil 21 wound on a plastic bobbin supported by a magnetic core 20 which together with a case 19 define a magnetic circuit, a plunger 22 slidably disposed within a central bore of the coil 21, a tubular rod 23 made of a nonmagnetic material such as stainless steel and connected at one end to the plunger 22 and inserted at the other end into an inner passage **6*a* of the armature rotary shaft 6 from the behind, and a movable contact 25 mounted on the rod 23 through an insulation 24. Within the tubular rod 23, a push rod 26 is slidably inserted so that the front end of the push rod 26 extending forward from the front open end of the tubular rod 23 abuts against the bottom wall of the recess formed in the end surface of the output rotary shaft 8 through a steel ball 27. A coil spring 28 is disposed within the tubular rod 23 to bias the push rod 26 and another coil spring 29 is disposed around the push rod 26 to hold the steel ball 27 in position. An electrically insulating material 30 is provided around a stationary contact 31 and an electric brush 33, the other end of the stationary contact 31 being a terminal bolt 32 for the connection of a cable to the unillustrated battery. The electromagnetic switch 18, the rear bracket 17, the d.c. electric motor 5 and the inner teeth gear member 10*e* are put together by the bolts 34**.

The operation of the coaxial engine starter as above constructed will now be described. When the engine starter switch (not shown) is turned on, the solenoid switch 18 is energized to move forward the plunger 22 and the tubular rod 23, so that the output rotary shaft 8 is moved forward by the thrust transmitted through the coil spring 28 and the push rod 26. This causes the pinion 15 to engage the engine ring gear (not shown) and the movable contact 25 on the tubular rod 23 to contact with the stationary contact 31 to energize the d.c. motor 5. Then, the rotational force of the armature rotary shaft 6 of the d.c. motor 5 is transmitted to the clutch outer member **11*b* of the over-running clutch 11 through the planetary speed reduction gear 10**, and this rotational force is further transmitted from the clutch inner member 11*b* to the output rotary shaft 8 to rotate the pinion 15, whereby the engine is driven.

After the engine is started and the power supply to the solenoid switch 18 is disconnected, the output rotary shaft 8 returns to its original position by a suitable return spring, thereby releasing the engagement between the pinion 15 and the engine ring gear (not shown). Also, the returned pinion 15 stops when its rear end surface 15*a* abuts against the front end of the inner race 12*b* of the ball bearing 12.

However, with the above-described coaxial engine starter, there is no shock-absorbing measure within the rotation transmission path extending from the armature rotary shaft 6 to the pinion 15, so that an excessive load is applied to the starter and the engine ring gear when an engine starting operation is carried out during the engine inertial rotation, leading to a fear that the components such as the pinion 15 of the starter can be damaged or destroyed.

SUMMARY OF THE INVENTION

Accordingly, the chief object of the present invention is to provide a coaxial engine starter which is free from the above discussed problems of the coaxial engine starter.

Another object of the present invention is to provide a coaxial engine starter in which the starter components can be protected against damages even when an excessive load is exerted on them during the operation of the engine starter.

With the above objects in view, the coaxial engine starter of the present invention comprises an electric motor having a hollow armature rotary shaft, an axially slidable output rotary shaft rotatably supported in a housing and having at its front end a pinion engageable with an engine ring gear, a solenoid switch disposed behind the electric motor for supplying current to the electric motor and causing sliding movement of the output rotary shaft, a planetary speed reduction gear, disposed in front of the electric motor and having a planetary bracket, for speed reducing the rotation of the armature rotary shaft, an over-running clutch, disposed in front of the planetary speed reduction gear and having a clutch outer member and a clutch inner member, for transmitting the speed-reduced rotation of the planetary speed reduction gear to the output rotary shaft. The planetary bracket of the planetary speed reduction gear is fitted against the clutch outer member of the over-running clutch in such a manner that they slip relative to each other when a predetermined rotational torque exerts therebetween. The starter also comprises a first bearing disposed between the planetary bracket and the armature rotary shaft for limiting the rearward movement of the planetary bracket, and a second bearing disposed between the housing and the clutch inner member of the over-running clutch for limiting the forward movement of the clutch outer member of the over-running clutch.

BRIEF DESCRIPTION OF THE DRAWINGS

The present invention will become more readily apparent from the following detailed description of the preferred embodiment of the present invention taken in conjunction with the acoompanying drawings, in which.

DESCRIPTION OF THE PREFERRED EMBODIMENT

Figure 1:
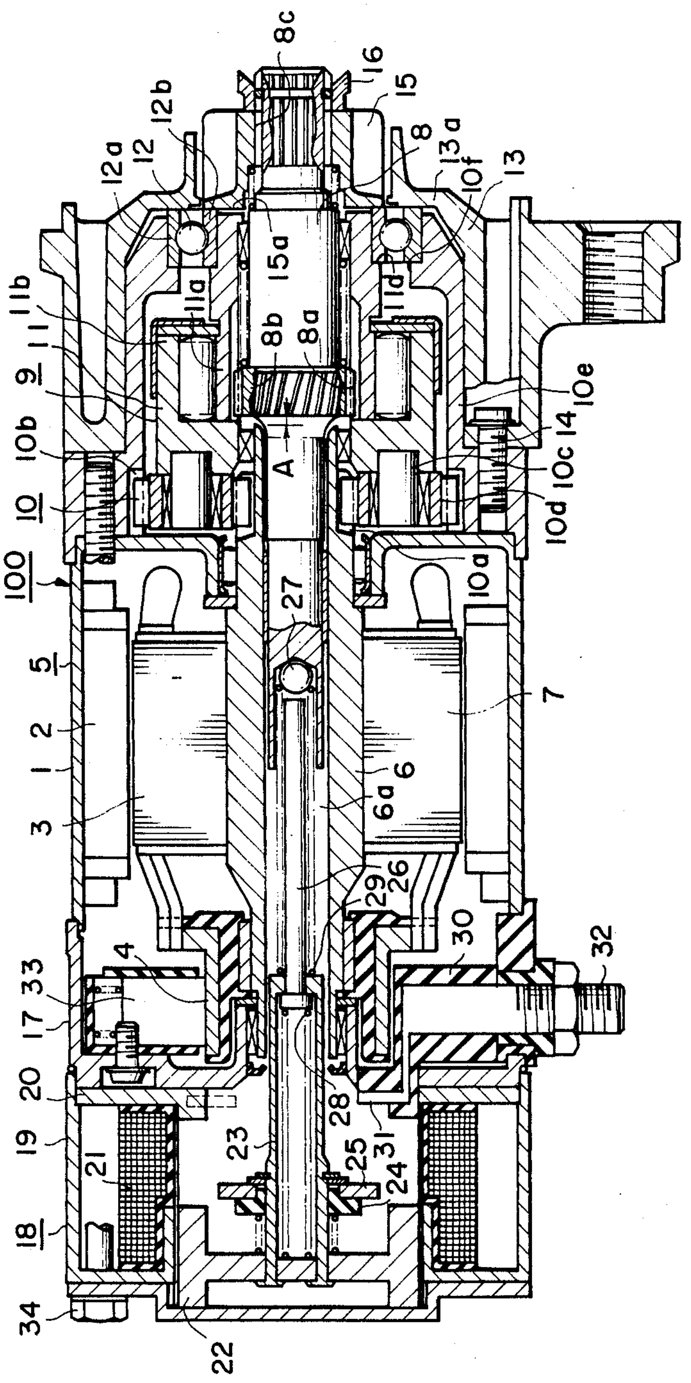
FIG. 1 is a sectional view of a coaxial engine starter of the type to which the present invention can be advantageously applied.
Figure 2:
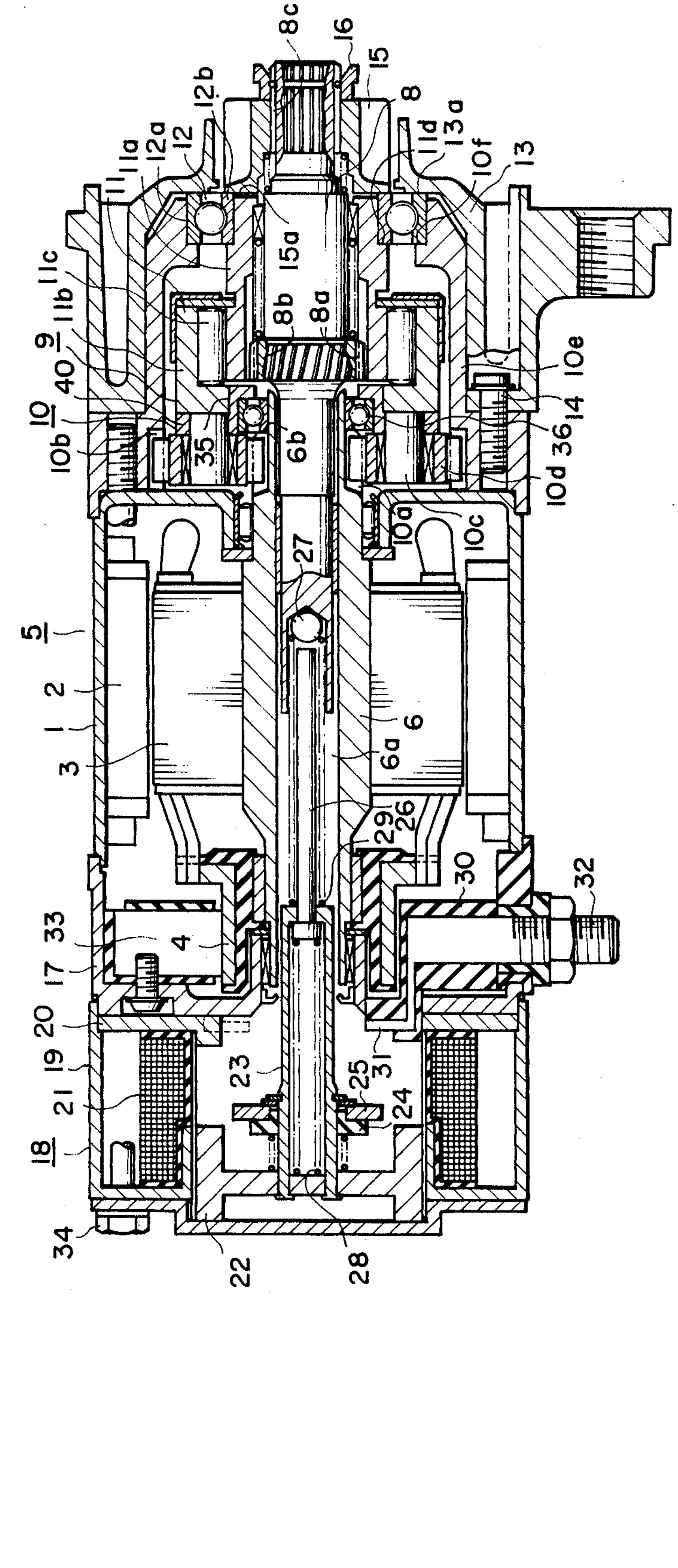
FIG. 2 is a sectional view of a coaxial engine starter constructed in accordance with the teachings of the present invention.
Figure 3:
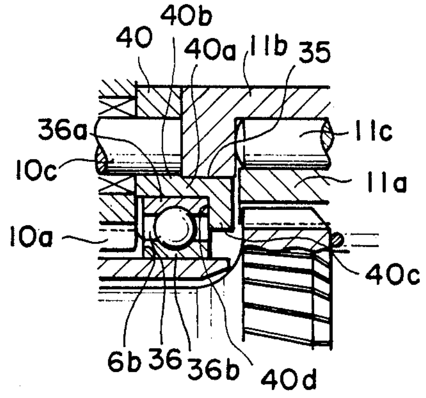
FIG. 3 is an enlarged partial view of the coaxial engine starter shown in FIG. 2.

FIGS. 2 and 3 illustrate one embodiment of a coaxial engine starter of the present invention. By comparing FIGS. 2 and 3 with FIG. 1, it is apparent that the basic structure of the engine starter of the present invention shown in FIGS. 2 and 3 is the same as that shown in FIG. 1, so that the description will be made only in terms of those components and structure different from the engine starter shown in FIG. 1 and the description of the same or corresponding components which are indicated by the same reference numerals will not be repeated.

As best shown in the enlarged sectional view of FIG. 3, the planetary speed reduction gear 10 includes a planetary bracket 40 or planetary frame into which the support pins 10*c* for rotatably supporting the planetary gears 10*d* are press-fitted. The planetary bracket 40 is a substantially annular member having a substantially crank-shaped cross section. In other words, the planetary bracket 40 can be said to have a cylindrical member 40*a*, an outwardly extending flange 40*b* at one end of the cylindrical member 40*a* and an inwardly extending flange 40*c* at the other end of the cylindrical member 40*a*. The support pins 10*c* are mounted to the outer flange 40*a*. An outer circumferential surface of the central cylindrical member 40*a* is fitted into the inner circumferential surface of the clutch outer member 11*b* of the over-running clutch 11 to form an interface 35 which allows relative sliding movement between the clutch outer member 11*b* and the planetary bracket 40 when a predetermined rotational torque is applied to them. The inner flange 40*c* is in engagement at the inner face 40*d* of the flange 40*c* with the front end of the outer race 36*a* of a first ball bearing 36. The rear end of the inner race 36*b* of the first ball bearing 36 is allowed to contact with the engagement portion 6*b* of the front end of the sun gear 10*a*. The planetary bracket 40 is thus supported and limited as to its axial movement in the rearward direction.

On the other hand, since the stepped portion 11*d* of the clutch inner member 11*a* is in engagement with the rear end of the inner race 12*b* of the second ball bearing 12, and since the rear end of the clutch inner member 11*a* and the inner front end of the clutch outer member 11*b* are engageable to each other with a small gap therebetween allowing relative rotation therebetween, the clutch outer member 11*b* is limited as to its axial movement in the forward direction by the clutch inner member 11*a* and the second ball bearing 12. In other respects, the structure is the same as that described in conjunction with the coaxial starter shown in FIG. 1.

With the coaxial engine starter constructed as above described, the planetary bracket 40 and the clutch outer member 11*b* are fitted in such a relationship that a relative slippage is allowed when a predetermined rotational torque is applied therebetween. Therefore, when an excessive amount of impact stress is generated in a drive force transmitting path from the d.c. motor 5 to the engine, such as when a starting operation is carried out during the inertial running of the engine, the planetary bracket 40 slips at the interface 35 relative to the clutch outer member **11*b* to absorb the impact stress exerted thereon, preventing the pinion 15**, the engine ring gear, etc. from being damaged or destroyed.

Also, since the planetary bracket 40 and the clutch outer member **11*b* are limited as to their axial movement by the first and the second ball bearings 36 and 12, the area of the interface 35 between the planetary bracket 40 and the clutch outer member 11*b* is prevented from being decreased, so that the magnitude of the rotational torque at which the slippage at the interface 35 initiates can be maintained substantially constant. Therefore, there is no fear that the rotation cannot be properly transmitted through the interface 35** during normal starting operation.

Further, since the clutch outer member **11*b* is supported by the first ball bearing 36 through the planetary bracket 40 on the shaft in the above embodiment, substantially no eccentricity is observed in the clutch outer member 11*b*, as opposed to the coaxial starter employing a sleeve metal, so that the life of the over-running clutch 11 becomes long and the reliability of the starter is increased. The first bearing 36 for providing the position limitation for the planetary bracket 40** may be of any other suitable bearing other than a ball bearing.

As has been described, according to the present invention, the planetary bracket of the planetary speed reduction gear is fitted against the clutch outer member of the over-running clutch in such a manner that they slip relative to each other when a predetermined rotational torque exerts therebetween, and comprises a first bearing disposed between the planetary bracket and the armature rotary shaft for limiting the rearward movement of the planetary bracket, and a second bearing disposed between the housing and the clutch inner member of the over-running clutch for limiting the forward movement of the clutch outer member of the over-running clutch. Therefore, even when an excessive load is applied during the starter operation, the impact stress can be absorbed to prevent damages to the starter parts, and the rotational torque at which the slippage occurs can be maintained substantially constant.

Further, since the planetary bracket 40 and the clutch outer member **11*b*** are separate pieces, the holes for receiving press-fit support pins therein can be through holes rather than a blind holes, making the forming of the holes easy.

What is claimed is:

1. A coaxial engine starter comprising:

an electric motor having a hollow armature rotary shaft;

an axially slidable output rotary shaft rotatably supported in a housing and having at its front end a pinion adapted to engage an engine ring gear;

a solenoid switch disposed behind said electric motor for supplying current to said electric motor and causing sliding movement of said output rotary shaft;

a planetary speed reduction gear, disposed in front of said electric motor and having a planetary bracket, for speed reducing the rotation of said armature rotary shaft;

an over-running clutch, disposed in front of said planetary speed reduction gear and having a clutch outer member and a clutch inner member, for transmitting the speed-reduced rotation of said planetary speed reduction gear to said output rotary shaft;

said planetary bracket of said planetary speed reduction gear being fitted against said clutch outer member of said over-running clutch in such a manner that they slip relative to each other upon a predetermined rotational torque exerted therebetween;

a first bearing disposed between said planetary bracket and said armature rotary shaft for limiting the rearward movement of said planetary bracket; and a second bearing disposed between said housing and said clutch inner member of said over-running clutch for limiting the forward movement of said clutch outer member of said over-running clutch.

* * * * *